June 13, 1950     A. A. BECHMANN     2,511,560
DISTRIBUTING SCOOP
Filed Dec. 29, 1945
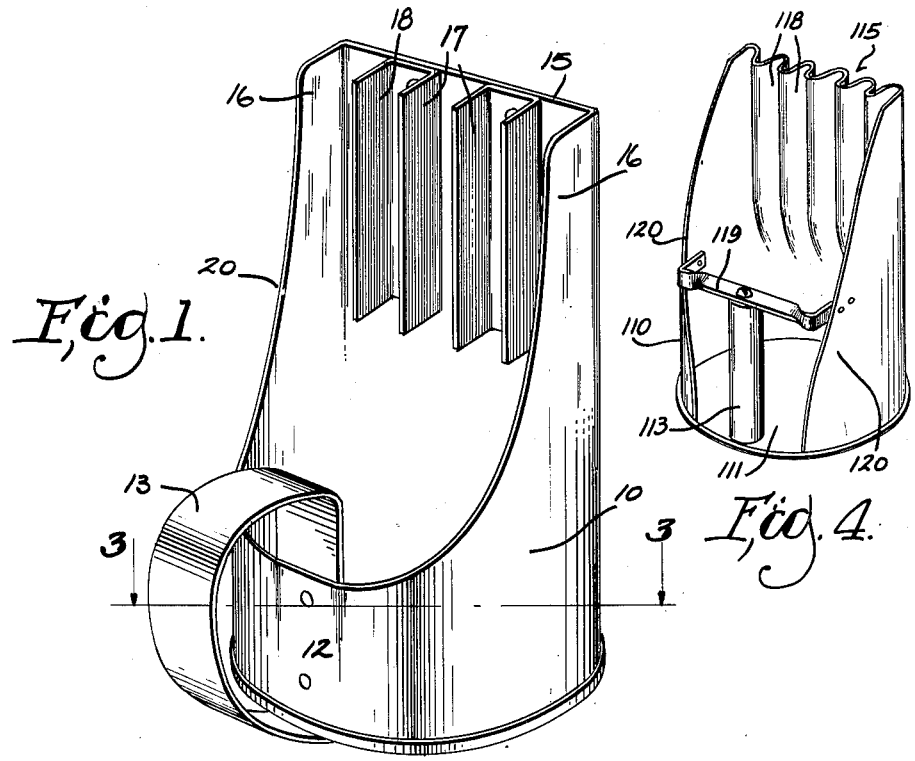
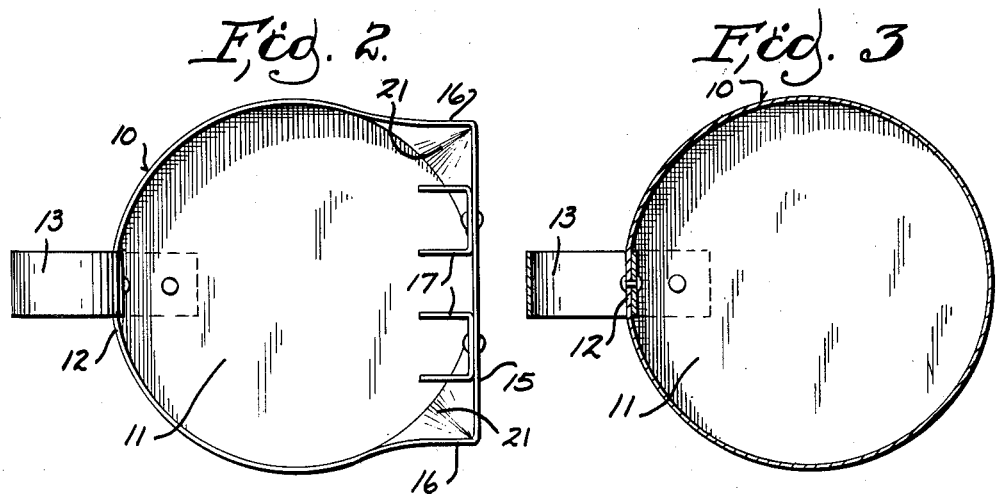
INVENTOR
AUGUST A. BECHMANN
BY Wheeler, Wheeler & Wheeler
ATTORNEYS Patented June 13, 1950

2,511,560

UNITED STATES PATENT OFFICE 2,511,560

DISTRIBUTING SCOOP

August A. Bechmann, Merrimac, Wis., assignor, by direct and mesne assignments, to Anna C. Duitman, Columbus, Wis.

Application December 29, 1945, Serial No. 638,163

2 Claims. (Cl. 275—11)

My invention relates to improvements in distributing scoops.

The object of my invention is to provide simple and inexpensive means for manually scattering powdered or granular materials, such as lime, fertilizer, or seeds, with greater uniformity of distribution than has heretofore been thought possible except by power driven metering and distributing mechanism.

In the drawings:

Figure 1 is a perspective view of my improved distributing scoop.

Figure 2 is a front elevation.

Figure 3 is a sectional view drawn to line 3—3 of Figure 1.

Figure 4 is a perspective view on a reduced scale, showing a modified form of scoop embodying my invention.

Like parts are identified by the same reference characters throughout the several views.

The body portion 10 of the scoop is preferably cylindrical in form, with its rear end 11 and top wall 12 provided with a substantially rigid handle 13. Its open front end is progressively pressed into the form of a rectangular scoop with a flat bottom 15, vertical sides 16 and open end and top portions. Channel bars are secured to the flat bottom portion 15 with their side flanges 17 parallel with the side walls 16.

The channel bars are spaced from each other and from the side walls 16 at distances substantially equal to the width of the channels in the channel bars, thus providing five channels of substantially equal width in the illustrated embodiment of my invention.

From the side walls 16 of the mouth portion to the cylindrical handle supporting portion, the top of the scoop is cut away in an oblique plane, as indicated at 20 in Figure 1, the scoop being entirely open at the top except at the end portion provided with the handle. The scoop may be filled by manipulation as any ordinary scoop in a bin or barrel, but when used as a distributor, the bottom portions 18 of the channel bars tend to obstruct the outward flow of the material and the side flanges 17 sub-divide the outwardly flowing stream. The portions of the stream flowing through those portions of the mouth not occupied by the channel bars tend to flow a little more rapidly than the portions which flow through the channel bars, and by oscillating the scoop from side to side in quick strokes, substantial uniformity in distribution of dry material is easily accomplished. It is not essential that the bottoms of the channel bars should partially obstruct the flow through the channels, but I prefer to mount the bottoms of the channel bars directly on the flat bottoms of the mouth portion of the scoop, as shown.

By providing the scoop with a raised handle 13, which extends over the closed end portion into the open portion, the scoop may be easily oscillated for distributing purposes. The number of the channel bars and their width, and that of the spaces between them, may be varied to suit the requirements of the material to be distributed.

When an ordinary scoop is swung from side to side for distributing purposes, the momentum of the material tends to make it follow the side walls at the end of each stroke, thus congesting the delivery in those areas directly receiving deliveries at such times, and widely scattering the deliveries made during the middle portion of the stroke. This tendency toward unequal distribution is in part overcome by the channel bars, and in part by the contours of the portions 21 which also tend to reduce the flow toward the sides of the scoop.

It is not essential that the channels 18 in the mouth portion be produced by attaching channel bars thereto.

In Figure 4 I have illustrated a modification having a body portion 110 substantially like that shown in Figure 1, but its mouth portion has a corrugated bottom 115 and vertical sides to which the corrugations are substantially parallel. This scoop may be formed from a single piece of sheet metal except for its rear end 111 and its handle 113, one end of the latter being preferably secured to the end wall 111 and the forward end of the handle being supported by a cross bar 119, having its ends secured to the curving side portions 120 in the rear of the corrugated and generally rectangular mouth portion. The corrugations being all located in substantially the same horizontal plane, substantial uniformity in the distribution of dry material is accomplished in substantially the same manner as in the embodiment shown in Figure 1, since the channels 118 effectively subdivide the material to be distributed.

I claim:

1. A distributing scoop adapted to be held in the hand and swung from side to side for the uniform distribution of its contents in the discharge thereof, said scoop having an open mouth portion provided with a flat bottom and side walls substantially perpendicular thereto, in combination with a set of spaced channel bars secured to the flat bottom portion with side flanges substantially parallel to said side walls and adapted to sub-divide the mouth portion into a series of channels of substantially equal width, said scoop having at a point remote from said mouth portion a closed cylindrical end portion provided with a manually operable handle.

2. A distributing scoop as set forth in claim 1, in which said handle extends over the said end portion into the open portion of the scoop.

AUGUST A. BECHMANN.

REFERENCES CITED

The following references are of record in the file of this patent:

UNITED STATES PATENTS

| Number | Name | Date |
|---|---|---|
| 35,916 | Beach | July 22, 1862 |
| 150,093 | Smith | Apr. 21, 1874 |
| 1,182,412 | Olesberg | May 9, 1916 |
| 1,212,305 | Worsell | Jan. 16, 1917 |
| 1,332,006 | Schadt et al. | Feb. 24, 1920 |

FOREIGN PATENTS

| Number | Country | Date |
|---|---|---|
| 29,672 | Great Britain | Dec. 24, 1912 |